May 6, 1924.
O. ROLLAG
1,493,128
REVERSIBLE PROPELLER FOR AIRCRAFT
Filed April 9, 1923
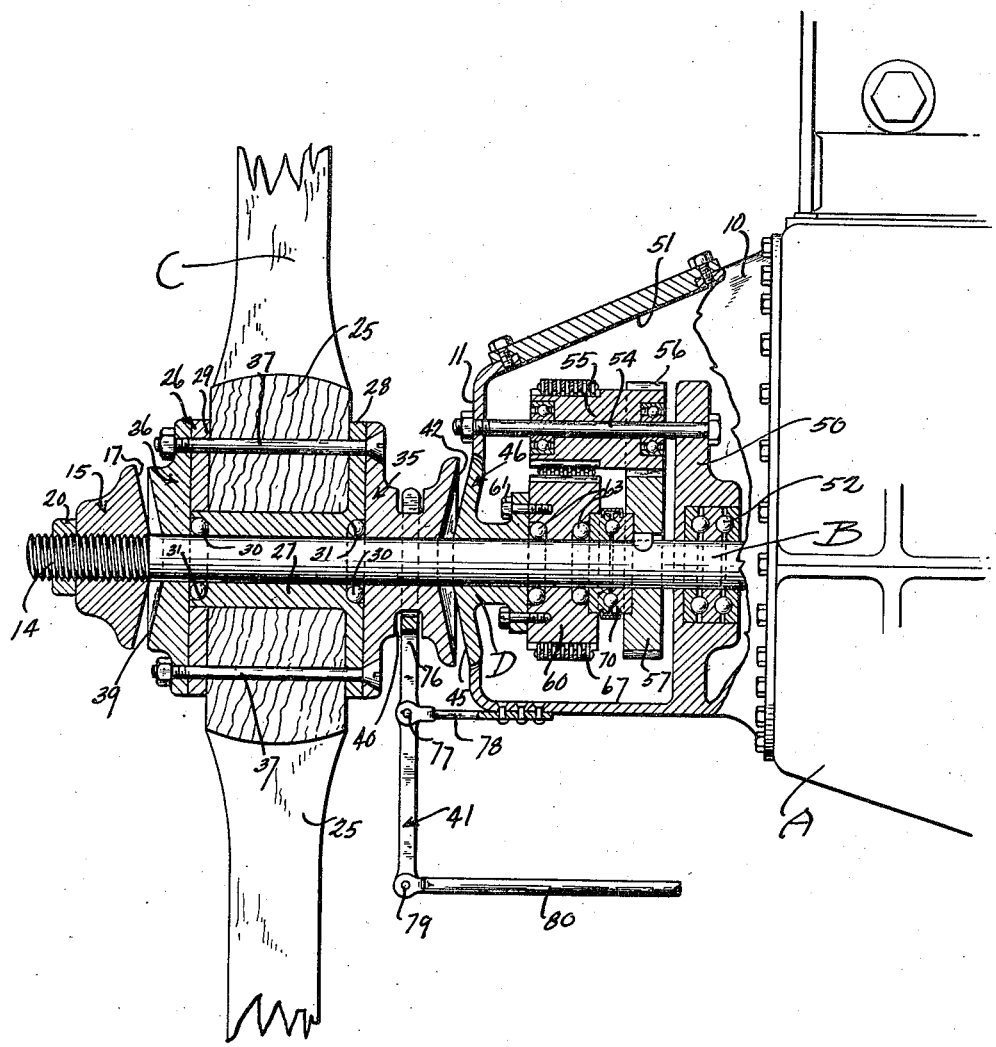
Inventor
Ole Rollag Patented May 6, 1924.

1,493,128

UNITED STATES PATENT OFFICE.

OLE ROLLAG, OF ANYOX, BRITISH COLUMBIA, CANADA.

REVERSIBLE PROPELLER FOR AIRCRAFT.

Application filed April 9, 1923. Serial No. 630,964.

*To all whom it may concern:*

Be it known that I, OLE ROLLAG, a subject of the King of Norway, residing at Anyox, in the Province of British Columbia, Dominion of Canada, have invented certain new and useful Improvements in Reversible Propellers for Aircraft, of which the following is a specification.

This invention relates to improvements in propeller mechanisms for aircraft.

The primary object of this invention is the provision of a novel type of propeller mechanism which will permit of rotation of the propeller in forward or reverse directions to selectively permit of use of the propeller for traction or braking purposes.

A further object of this invention is the provision of a practical and novel arrangement for selective forward or reverse drive of an aircraft propeller, and by means of which the propeller may not only be used for traction purposes, but may be used as a brake for the aircraft to which it is attached, so that the aircraft may effect a landing in restricted quarters.

A further object of this invention is the provision of a novel aircraft propeller mechanism, which will permit of the propeller remaining stationary during operation of the engine; the propeller assuming a neutral position, so that the engine may be operated for testing or tuning up, so to speak.

Other objects and advantages of this invention will be apparent during the course of the following detailed description.

In the accompanying drawing, forming a part of this specification, and wherein similar reference characters designate corresponding parts, The view illustrates the improved propeller mechanism, partly in section, showing the novel cooperating details thereof.

In the drawing, wherein for the purpose of illustration is shown but the preferred embodiment of this invention, the letter A may designate a prime mover, such as an internal combustion engine, including a drive shaft B upon which the propeller C is rotatably mounted for sliding longitudinally thereof. Clutch means D may be provided, affixed in any approved manner for rotation by the drive shaft B to selectively permit of forward or reverse directional driving of the propeller C for traction or braking purposes.

Referring to the internal combustion engine A, the same may include the forward housing 10, through the front wall 11 of which the drive shaft B extends; the latter being screw threaded, as at 14, upon its free end for receiving a clutch part or member 15 thereon. This clutch part or member 15 may be provided with the conical or convex friction face 17 for cooperation with certain clutch details of the propeller C, as will be subsequently described. The clutch part 15 is of course detachably carried by the screw threaded end 14 of the drive shaft B, and may be retained in rigid and fixed relation upon the drive shaft, as by means of a nut 20.

Referring to the construction of the propeller C, the same may include a plurality of blades 25, connected at their adjacent ends by means of a hub structure 26. The hub structure 26 may include the bearing sleeve 27, provided with a flange 28 integral therewith at one end, adapted for overlying the inside surfaces of the propeller blades 25; the sleeve portion 27 extending transversely through the connected ends of the blades and having a disc shaped flange ring 29 positioned thereon in abutting relation with the forward face of the propeller blades 25. The propeller C is adapted for rotational and longitudinal sliding movement upon the drive shaft B, intermediate the clutch part 15 of the drive shaft, and the front wall 11 of the internal combustion engine housing 10. It is preferred that anti-friction bearings, such as ball bearings 30 be rotatably disposed in suitable raceways 31 provided in the hub sleeve 27 at the ends thereof; these ball bearings 30, of course, being adapted for supporting the propeller C upon the drive shaft B substantially as is illustrated in the drawing.

Forward and rear clutch parts 35 and 36 are preferably attached to the propeller C, as by means of transverse bolts 37, which extend through the flange or disc portions 28 and 29 of the hub structure 26, and connect the entire hub structure and the clutch parts 35 and 36 together. In this connection, it is to be noted that the clutch parts 35 and 36 maintain the ball bearings 30 in their proper raceways against liability of detachment. The forward clutch part 36 is preferably provided with a concave clutch face 39, which is adapted for cooperative frictional engagement with the cone shaped face of the clutch part 15 carried by the drive shaft B. The rear clutch member 35 is somewhat different in formation from the outer or forward clutch member 36, being provided with an annular groove 40, within which control or operating mechanism 41 cooperates to effect longitudinal movement of the propeller C upon the drive shaft B, as will be subsequently described. The clutch member 35 is likewise provided with a concaved friction face 42, in facing relation with the internal combustion engine A, and adapted for cooperation against the cone or convex friction face 45 of a clutch part or member 46 which extends through the front wall 11 of the internal combustion engine housing 10, and is included as a part of the clutch means D; being driven in opposite direction to the drive shaft B.

Referring to the means to effect drive of the clutch member 46, it is preferred that a supporting extension 50 be provided within the compartment 51 of the housing 10, which may rotatably receive the drive shaft B therethrough, supporting the same by means of an anti-friction arrangement 52. A counter-shaft 54 is preferably carried upwardly of the drive shaft B, parallel therewith, having an end thereof supported at the upper end of the supporting post or extension 50 and the other end thereof detachably engaging the front wall 11 of the housing 10. This shaft 54 may rotatably support a novel gear 55, provided at one end with teeth 56 adapted for intermeshing with a gear 57 keyed to the drive shaft B, in order to effect rotation of the gear 55 upon the shaft or bolt 54. Suitable bearings for support of the gear 55 may of course be provided. A gear or sprocket 60 may be keyed or bolted, as at 61, to the inner end of the clutch member 46, and within the housing 10; said gear or sprocket 60 being rotatably supported as by means of anti-friction bearings 63 upon the drive shaft B, and adapted to cooperate with the novel gear member 55 in receiving a silent drive chain 67, whereby the gear or sprocket 60 may be driven upon the drive shaft B in opposite rotational direction to the drive shaft B. It is preferred that a thrust bearing 70 be provided intermediate the keyed gear 57 and the gear or sprocket 60, which will take up thrust incident to drive of the propeller C, by means of engagement of the clutch parts 35 and 46. The ball bearings 63 are of course supported in suitable runways in the gear or sprocket 60 being retained therein by certain details of the clutch part 46 and the thrust bearings 70.

Referring to the operating means 41, the same may include the ordinary yoke 76, the fingers of which may extend into groove 40 of part 35, and which may be pivoted, as at 77 intermediate its ends upon a bracket 78 rigidly extending from the internal combustion engine housing 10. At its free end, the yoke 76 may be connected, as at 79 to an operating rod 80 which may lead to the fuselage or any suitable location, so that the driver of the aircraft may have complete control of the propeller, in order to effect rotational drive or neutral positioning of the same.

In operation, assuming that it is the desire of the operator to run the engine without operation of the propeller. For this relation of parts, the operator positions the propeller C, by means of the operating mechanism 41, in the position illustrated in the drawing, and in which position the clutch parts 35 and 36 of the propeller C are out of engagement and in spaced relation to the clutch parts 15 and 46 of the internal combustion engine drive apparatus. To obtain a tractor effect of the propeller C, it is merely necessary for the operator to pull rearwardly upon the operating rod 80, and by which operation the propeller C will be moved longitudinally upon the drive shaft B, so that the clutch faces 17 and 39 of the clutch parts 15 and 36 frictionally engage. It is obvious that the propeller C will then be driven in forward direction to propel the aircraft to which the same is attached. To obtain a braking effect by means of the propeller C, the operator through the operating control means 41 will move the propeller C longitudinally rearwardly upon the drive shaft B, in order to frictionally engage the clutch faces 42 and 45 of the clutch parts 35 and 46 respectively, and it is obvious that the propeller C will be given in reverse direction to that above described, and it will, of course, give a braking effect, so that the aircraft moving through space may be abruptly stopped, within very short distance from the start of the braking movement of the propeller C, so that the aircraft may land in restricted quarters.

From the foregoing description of this invention, it is obvious that a propeller mechanism for aircraft has been provided which is a practical working arrangement, and by means of which the propeller may be controlled as above described. While the means for rotating the clutch part 46 in direction opposite to movement of the drive shaft B is desirable, yet the same end may be attained in many ways, as by means of intermeshing gears, in lieu of the silent chain drive.

Various changes in the shape, size, and arrangement of parts, may be made to the form of invention herein shown and described, without departing from the spirit of the invention or the scope of the claims.

I claim:

1. In an aircraft propeller mechanism, the combination with a shaft, of a propeller longitudinally slidable on said shaft, and drive means for selective engagement by said propeller to rotate the latter in forward or reverse directions.

2. A propeller mechanism for aircraft comprising a drive shaft, a propeller including a hub having clutch parts on opposite sides rigid therewith, a clutch member rigid with the drive shaft for rotation therewith, a clutch member rotatable on the drive shaft, means connecting the last mentioned clutch member for drive by said drive shaft in opposite direction thereto, and means for moving the propeller longitudinally of the drive shaft into selective engagement with the clutch member fixed on the drive shaft or clutch member rotatable in opposite direction to the drive shaft.

3. As an article of manufacture, a propeller including blades, a hub sleeve fixed to said blades, anti-friction bearings carried by said hub sleeve, and clutch parts detachably secured on opposite sides of the propeller and upon opposite sides of the hub sleeve to maintain said anti-friction bearings in said hub sleeve.

4. A propeller mechanism for aircraft engines including a drive shaft, clutch members carried by said drive shaft, means connecting said clutch members to the drive shaft for rotation in opposite directions, a propeller slidable on the drive shaft, clutch members fixed to the propeller for cooperation with the clutch members of said drive shaft, and means for moving said propeller for selective engagement of the clutch members of the propeller with the clutch members of the drive shaft for rotation of the propeller in forward or reverse directions.

5. A device of the class described comprising a drive shaft, a clutch part keyed to the drive shaft, a clutch part rotatable on the drive shaft, means connecting the rotatable clutch part to the drive shaft for rotation about said drive shaft in opposite direction to the direction of movement of the drive shaft, a propeller rotatably and longitudinally slidably mounted upon the drive shaft intermediate the clutch parts thereof, and means for moving said propeller into selective engagement with either of the clutch parts of said drive shaft.

6. In a device of the class described, the combination with a drive shaft, of a friction clutch part keyed thereto, a friction clutch part rotatably mounted upon the drive shaft in spaced relation to the first mentioned clutch part, means connecting said last mentioned clutch part for rotational movement by the drive shaft in opposite rotational direction to the movement of the drive shaft, a propeller embodying blades and a hub structure rotatably bearing on said drive shaft, clutch parts rigidly affixed to said propeller upon opposite sides thereof in facing cooperative relation with the clutch parts fixed and rotatable on the drive shaft, and operating means engaging one of the fixed clutch parts of said propeller to effect longitudinal movement of the propeller upon the drive shaft for selectively positioning the same in neutral relation to the clutch parts of the drive shaft, or for moving the clutch parts of the propeller into frictional clutching relation to the clutch parts of the drive shaft to effect rotational movement of the propeller in forward or reverse directions.

OLE ROLLAG.